United States Patent Office 3,450,812
Patented June 17, 1969

3,450,812
SOLUBILIZATION OF ANTI-CARIES AGENT
Don Navarro Harris, Somerset, N.J., assignor to Colgate-Palmolive Company, New York, N.Y., a corporation of Delaware
No Drawing. Filed June 30, 1966, Ser. No. 561,698
Int. Cl. A61k 7/16, 27/00
U.S. Cl. 424—49     3 Claims

ABSTRACT OF THE DISCLOSURE

Solubilization of the antimicrobial agent described in U.S. Patent No. 3,218,239 in a fatty acid ester of a polyethylene glycol of a molecular weight of 400, such as the monococoate ester. The solution of the antimicrobial agent is readily incorporated into oral compositions such as toothpastes.

---

This invention relates to the solubilization of water-insoluble antimicrobial agents and to aqueous solutions thereof having particular utility in dentifrices, mouth washes and the like.

More specifically, this invention relates to a method of solubilizing a water-insoluble antimicrobial substance particularly described and designated in United States Letters Patent No. 3,218,239 as "M–188" which comprises dissolving said substance in a fatty acid ester of a polyethylene glycol of a molecular weight of 400 at substantially room temperature, and then diluting with water. The sequence of steps of first dissolving the agent in the polyethylene glycol 400—fatty acid ester solvent, and then adding the water is essential.

The instant antimicrobial agent consists of a nitrogenous base and acid-addition salts thereof, said base having the following properties: soluble in methanol, ethanol, chloroform, ethyl acetate, and benzene but insoluble in saturated hydrocrabons; an ultraviolet absorption spectrum in chloroform exhibiting a maximum of $$E^{1\%}_{1\,cm.} = 280$$

at 278 millimicrons and a minimum of $$E^{1\%}_{1\,cm.} = 29$$

at 232 millimicrons; exhibiting strong absorption in the infrared of the spectrum when suspended in a 7% chloroform solution at the following frequencies expressed in reciprocal centimeters: 2933, 1727, 1597 and 1163; having an optical rotation $[\alpha]_D^{25} = -40°$ (1% in chloroform); an empirical formula of $C_{38}H_{61}NO_{14}$; and elemental analysis of 60.37% carbon, 8.21% hydrogen, 1.91% nitrogen and 29.51% oxygen by difference; a calculated molecular weight of 756 and a $pK_a$ of 6.7 when titrated in 50% aqueous ethanol solution. Examples of useful acid addition salts of the aforesaid base include the salts formed with salicylic, citric, tartaric, gluconic, benzoic, acetic, and sulfuric acids and hydrogen chloride and hydrogen fluoride, i.e., the salicylate, citrate, tartrate, gluconate, benzoate, acetate, sulfate hydrochloride, and hydrofluoride salts. The antimicrobial agent designated as "PA–108" in the publication by Murai et al., in "Antibiotics and Chemotherapy," vol. IX—No. 8, August 1959, pp. 485–490, and as "PA–1008" in United States Letters Patent No. 3,214,339 also appears to be identical with "M–188."

The addition of the antimicrobial agent directly to an aqueous solution of said solvent results in incomplete dissolution thereof.

Heating the ester solvent apparently does not increase the solubility of the antimicrobial agent therein, but causes precipitation of some unknown component of the solvent. Consequently, dissolution must necessarily be conducted at substantially room temperature.

The solvents employed in this invention are the fatty acid esters of polyethylene glycol of molecular weight 400 such as polyethylene glycol 400 esters of higher fatty acids containing from about 10 to 18 carbon atoms, e.g., polyethylene glycol 400-monococoate, polyethylene glycol 400-dioleate, polyethylene glycol 400-monolaurate, polyethylene glycol 400-monostearate and polyethylene glycol 400-esters of coconut oil fatty acids and mixtures thereof. These polyethylene glycol fatty acid esters are water-soluble, non-toxic liquids. The administration of the solvent per se to mice via the oral route, proved to be innocuous.

In the preparation of the stable, clear aqueous solution of the water-insoluble antimicrobial agent, it is essential that said agent be first dissolved in the ester solvent and then diluted with water. The maximum concentration that can be diluted 1:10 without precipitation is 12.7% antimicrobial agent in polyethylene glycol 400-fatty acid ester. This solution is capable of further dilution with water, to the extent of 1:10,000, without the occurence of precipitation. Clear aqueous solutions have been prepared containing a maximum of 1.27% antibacterial agent and 10% polyethylene glycol 400-fatty acid ester, and as little as 0.00125% antimicrobial agent and 0.01% solvent. These solutions have been found to be stable, non-toxic, and effective as a prophylactic in oral compositions. Another advantageous feature of these solutions is their substantially neutral pH, which facilitates their incorporation into oral formulations such as dentifrices, mouth washes, tablets, etc.

The following specific examples of aqueous solutions are merely illustrative and it is understood that the invention is not limited thereto. All amounts in these examples as well as elsewhere throughout the instant specifications and claims, are by weight unless otherwise specified.

Example I 500 mg. of antibacterial agent M–188 is dissolved in 10 mls. of polyethylene glycol 400-monococoate with simple stirring. This solution is diluted with 90 ml. of water, resulting in a solution containing 0.5% antibacterial agent in 10% aqueous polyethylene 400-monococoate, which has a pH of 6.3.

Example II

The solution of Example I is diluted 1:10 with simple stirring, yielding 0.05% antimicrobial agent in 1% aqueous polyethylene glycol 400-monococoate.

Examples III–XIV

The following solutions are prepared in accordance with the method of Example I, using polyethylene glycol 400-monococoate as the solvent.

| Concentration of antibacterial agent M-188 in aqueous solution, percent | Concentration of solvent in aqueous solution, percent | Dilution of 12.5% agent in water | pH of aqueous solution |
|---|---|---|---|
| III | 1.25 | 10 | 1:10 (1 ml. 12.5% M-188+9 ml. H₂O). | 6.8 |
| IV | 0.625 | 5 | 1:20 (.5 ml. 12.5% M-188+9.5 ml. H₂O). | 6.9 |
| V | 0.313 | 2.5 | 1:40 | 7.0 |
| VI | 0.157 | 1.25 | 1:80 | 7.1 |
| VII | 0.105 | 0.83 | 1:15 of Example VI | 6.85 |
| VIII | 0.078 | 0.625 | 1:2 of Example VI | 7.2 |
| IX | 0.0314 | 0.25 | 1:5 of Example VI | 6.7 |
| X | 0.0157 | 0.125 | 1:10 of Example VI | 6.9 |
| XI | 0.0125 | 0.1 | 1:1000 | 6.75 |
| XII | 0.0063 | 0.05 | 1:2 of Example XI | 6.55 |
| XIII | 0.0025 | 0.02 | 1:5 of Example XI | 6.45 |
| XIV | 0.00125 | 0.01 | 1:10 of Example XI | 6.55 |

Any suitable amount of the antimicrobial agent in the form of a clear aqueous solution thereof may be incorporated into a variety of oral formulations. The specific amount will vary, naturally, depending upon the specific type of preparation and the specific effects desired, but will generally be a minor amount of the composition, usually at least about 0.01% by weight thereof. The aqueous solutions of this invention may be utilized as a mouth rinse per se.

The stable, clear, aqueous solutions of the instant invention may be readily incorporated into a variety of oral compositions inclusive of toothpastes, powders, creams, mouth washes, dental tablets, lozenges, etc., by simple addition thereto.

The ingredients normally found in aforesaid dental formulations such as polishing agents, binders, humectants, gelling agents (in dental creams), whitening agents, coloring agents, preservatives, flavoring agents, fluorine-containing compounds, etc., do not adversely affect the activity of the antimicrobial agent. On the contrary, the presence of organic surface active agents in said oral compositions may co-act with the antimicrobial agent to achieve increased prophylactic action, assist in achieving thorough and complete dispersion of the instant compositions throughout the oral cavity, and render the instant compositions more cosmetically acceptable. The organic surface active material may be anionic, nonionic, ampholytic, or cationic in nature, and it is preferred to employ as the surface active agent a detersive material which imparts to the composition detersive and foaming properties.

Although the present invention has been described with reference to particular embodiments and examples, it will be apparent to those skilled in the art that variations and modifications of this invention can be made and that equivalents can be substituted therefor without departing from the principles and true spirit of the invention.

What is claimed is:

1. A stable, clear, aqueous solution comprising a water-insoluble antimicrobial agent consisting of a nitrogenous base, having an empirical formula of $C_{38}H_{61}NO_{14}$ and an elemental analysis of 60.37% carbon, 8.21% hydrogen, 1.91% nitrogen and 29.51% oxygen by difference, a calculated molecular weight of 756, a $pK_a$ of 6.7 when titrated in 50% aqueous ethanol solution, an ultraviolet absorption spectrum in chloroform exhibiting a maximum of $$E^{1\%}_{1\,cm.} = 280$$

at 279 millimicrons and a minimum of $$E^{1\%}_{1\,cm.} = 29$$

at 232 millimicrons, a strong absorption in the infrared of the spectrum when suspended in a 7% chloroform solution at the following frequencies expressed in reciprocal centimeters: 2933, 1727, 1597, and 1163, and an optical rotation $[\alpha]_D^{25} = 40°$ (1% in chloroform); said antimicrobial agent being dissolved in monococoate ester of polyethylene glycol of molecular weight 400 and present in a maximum amount of 12.7% of weight of said ester; said antimicrobial agent being present in an amount of at least 0.00125% by weight of said aqueous solution and said ester being present in an amount of at least 0.01% by weight of said aqueous solution.

2. A solution in accordance with claim 1, which has a substantially neutral pH.

3. An aqueous solution in accordance with claim 1 which contains 1.27% by weight of said solution of said antimicrobial agent and a maximum of 10% by weight of said solution of said polyethylene glycol 400-fatty acid ester.

References Cited

UNITED STATES PATENTS 3,330,731    7/1967    Mehaffey.
3,342,687    9/1967    Gould _____ 167—93

OTHER REFERENCES

Chemical Abstracts, vol. 63, entry 12977b, 1965, citing Khawan et al., Sci. Pham., 33(2), 90–101 (1965).

RICHARD L. HUFF, Primary Examiner.

U.S. Cl. X.R.

424—121